(12) United States Patent
Baer et al.

(10) Patent No.: US 8,475,864 B1
(45) Date of Patent: Jul. 2, 2013

(54) METHOD FOR REMOVING AN OXIDIZED OFF-FLAVOR FROM MILK

(75) Inventors: Robert J. Baer, Brookings, SD (US); Howard H. Bonnemann, Brookings, SD (US)

(73) Assignee: South Dakota State University, Brookings, SD (US)

( * ) Notice: Subject to any disclaimer, the term of this patent is extended or adjusted under 35 U.S.C. 154(b) by 1963 days.

(21) Appl. No.: 11/014,330

(22) Filed: Dec. 16, 2004

(51) Int. Cl.
*A23C 9/00* (2006.01)

(52) U.S. Cl.
USPC .......................... 426/580; 426/491; 426/520

(58) Field of Classification Search
USPC ................. 426/478, 490, 491, 492, 520, 521, 426/522, 580, 583
See application file for complete search history.

(56) References Cited

U.S. PATENT DOCUMENTS

| | | | | |
|---|---|---|---|---|
| 2,709,137 | A | * | 5/1955 | Freund et. al. ................. 426/580 |
| 3,329,505 | A | * | 7/1967 | Rausing ........................ 426/418 |
| 3,949,099 | A | | 4/1976 | Kaufman |
| 4,053,644 | A | | 10/1977 | Swaisgood |
| 4,996,069 | A | | 2/1991 | de Hey et al. |
| 5,139,803 | A | | 8/1992 | Haynes et al. |
| 5,178,892 | A | | 1/1993 | Simmons et al. |
| 5,427,806 | A | | 6/1995 | Ekanayake et al. |
| 6,153,240 | A | | 11/2000 | Tottenham et al. |
| 2001/0026825 | A1 | | 10/2001 | Reaves et al. |
| 2003/0054079 | A1 | | 3/2003 | Reaves et al. |

OTHER PUBLICATIONS

Dairy Science and Technology, "www.foodsci.uoguelph.ca/dairyedu/fluid.html", Dairy Products: Overview and Fluid Milk Products.
Dairy Science and Technology, "www.foodsci.uoguelph.ca/dairyedu/fluid.html", Pateurization.
Dairy Science and Technology, "www.foodsci.uoguelph.ca/dairyedu/fluid.html", UHT Processing.
MSN Encarta-Print Preview-Milk, "encarta.msn.com/text_761562453_2/milk.html", MIlk.
Howstuffworks, "www.science.howstuffworks.com/question147.html", What are homogenization and pasteurization.
Energy Technologies, "tristate.apogee.net/et/exifi.asp", Milk Processing Industry.
SSP PVT Limited, "www.sspinda.com/dairy-industry", Liquid Milk Processing Plant.
Basic Flow—HIST Pasteurization, "www.foodsci.uoguelph.ca/deicon/basic.html", HIST milk pasteurization equipment and the flow of milk through it.
F.W. Bodyfelt, M.S. et al, "The Sensory Evaluation of Dairy Products", 1988, pp. 67-76, Van Nostrand Reinhold.
John M. DeMan, "Principles of Food Chemistry", 1980, pp. 58-67, Avi Publishing Company.
James Lloyd Henderson, M.S., Ph.D., "The Fluid-milk Industry", 1971, p. 219, Avi Publishing Company.
Dr. Charles White, "Protecting Milk from Light", Apr. 1984, Dairy Record.
Arthur Hansen, "Making Milk Taste Better", Feb. 25, 1998, v. 143, n. 4, Hoard's Dairymen.
Kitty Broihier, R.D., "Milking it", Mar. 1998, v. 60, n. 3, Food Processing.
I.A. Gould, Jr. et al., "Effect of Heat on Milk With Especial Reference to the Cooked Flavor", May 1939, Mechincal Bulletin 164, Michigan State College.
Vladimir N. Krukovsky, et al., "The Influence of Tocopherols and Cod Liver Oil on The Stability of Milk", 1949, vol. 32, Journal of Dairy Science.
Stuart Patton, "The Mechanism of Sunlight Flavor Formation in Milk With Special Reference to Methionine and Riboflavin", 1954, vol. 37, Journal of Dairy Science.

* cited by examiner

*Primary Examiner* — Leslie Wong
(74) *Attorney, Agent, or Firm* — Morriss O'Bryant Compagni

(57) ABSTRACT

A method of reversing the formation of an oxidized off-flavor in milk that includes providing milk, and heating the milk to a temperature between approximately 70° C. and approximately 90° C. for a period of between approximately 25 seconds and approximately 60 seconds.

2 Claims, 2 Drawing Sheets

METHOD FOR REMOVING AN OXIDIZED OFF-FLAVOR FROM MILK

BACKGROUND OF THE INVENTION

1. Field of the Invention

The present invention relates to methods for processing milk, and more particularly pertains to a new process for removing, or reversing, an oxidized off-flavor from milk.

2. Description of the Prior Art

Milk may acquire an off-taste in a number of ways. For example, under proper conditions, unsaturated fatty acids that are present in milk fat can react with oxygen to form oxidation products, and the presence of these oxidation products in the milk can give an "oxidized off-flavor" to the milk. More specifically, milk that has an oxidized off-flavor will exhibit a cardboard-like, metallic, or tallowy taste and smell (Bodyfelt, F. W., J. Tobias, and G. M. Trout, 1988, The Sensory Evaluation of Dairy Products, Van Nostrand Reinhold, New York, N.Y.). The rate of oxidation of these unsaturated fatty acids can be affected by many factors, including the amount of oxygen present in the environment, the degree of unsaturation of the lipid in the milk, the presence of antioxidants or prooxidants in the milk, the nature of the packaging material for the milk, the temperature of the storage of the milk, and the degree of light exposure to the milk (deMan, J. M., 1980, Principles of Food Chemistry, The AVI Publ. Co., Inc., Westport, Conn.). "Metal-induced" oxidized off-flavor in milk was once a common problem caused by metal contamination of the milk, which resulted from exposure to dairy equipment that contained copper. Today most dairy equipment is manufactured from stainless steel, which does not cause metal contamination of milk and thus stainless steel does not contribute to a metal-induced oxidized off-flavor in milk. (Henderson, J. L., 1971, The Fluid-Milk Industry, $3^{rd}$ ed., The AVI Publ. Co., Inc., Westport, Conn.). Despite this change in equipment, the problem of the oxidized off-flavor in milk has not disappeared.

In 1962, only about 3% of the fluid milk produced in the U.S. was packaged in plastic containers, while today about 81% of the fluid milk is packaged in plastic containers. Plastic containers that are clear in character easily transmit ultraviolet light (e.g., light waves in the 350 to 500 nanometer range) which is damaging to milk nutrients and can cause "light-induced" oxidized off-flavor (also known as light-activated flavor) in the milk (White, C., 1984, Dairy Record 85(4):122). Ultraviolet light is produced by fluorescent lights, which are found in most dairy display cases in supermarkets in the United States. The time of light exposure that produces light-induced oxidized off-flavor in milk is dependent upon the distance of the milk container from the fluorescent light. It is estimated that for large supermarkets, the turnover rate of milk in the display case ranges from approximately 4 to 8 hours and the typical range of fluorescent light intensity is between 750 and 1000 lux (White, C., 1984, Dairy Record 85(4):122). Exposure of milk to fluorescent light for extended periods of time can also cause the loss of vitamins A, riboflavin ($B_2$), and C from the milk (Hansen, A., 1998, Hoard's Dairymen 143(4):147).

Several approaches have been reported for attempting to prevent or inhibit the acquisition of an oxidized off-flavor by milk. The reduction in the per capita consumption of milk in the U.S. has been attributed to the increased use of plastic milk containers and increased incidence of light-induced oxidized off-flavor (Hansen, A., 1998, Hoard's Dairymen 143 (4):147). Paper milk cartons typically provide greater protection for milk from light-induced oxidized off-flavor than clear glass or clear plastic. Opaque or pigment-modified containers can inhibit light-induced oxidized off-flavor. Such containers have been developed by adding light-blocking agents to the resins before blow molding single-service plastic bottles (Bodyfelt, F. W., J. Tobias, and G. M. Trout, 1988, The Sensory Evaluation of Dairy Products, Van Nostrand Reinhold, New York, N.Y.). Today some dairy plants are offering milk in opaque colored bottles that protect the flavor and nutrients of the milk (Broihier, K., 1998, Food Processing 60(3):53). These containers do appear to offer better protection from light than clear plastic containers, however some light can still be transmitted through the wall of the container.

Other factors may minimize or reduce the formation of the oxidized off-flavor in milk. Homogenization of milk increases the surface area of the fat globules in the milk, and the composition and the properties of the fat globules change. The new membrane that is formed around the fat globule consists primarily of protein which protects the phospholipids in the milk fat from attack by oxygen. This mechanism can give the homogenized milk some protection against the development of a "metal-induced" oxidized off-flavor. However, the homogenized milk is more susceptible to "light-induced" oxidized off-flavor (Bodyfelt, F. W., J. Tobias, and G. M. Trout, 1988, The Sensory Evaluation of Dairy Products, Van Nostrand Reinhold, New York, N.Y.). High heat treatment (at 76° C. to 78° C.) of milk provides protection against the development of an oxidized off-flavor. Sulfide and sulfhydryl groups from whey proteins are liberated or activated, which can act as antioxidants (Gould, I. A. and H. H. Sommer, 1939, Michigan Agr. Exp. Stn. Tech. Bull. 164). Another factor which may control the formation of an oxidized off-flavor in milk is the introduction of green feed into the dairy cow rations (Bodyfelt, F. W., J. Tobias, and G. M. Trout, 1988, The Sensory Evaluation of Dairy Products, Van Nostrand Reinhold, New York, N.Y.). Also, increasing the tocopherol (vitamin E) content in the milk can inhibit the formation of an oxidized off-flavor in the milk (Krukovsky, 1949, J. Dairy Sci. 32:196.

The oxidative reaction, once started is a chain reaction. New free radicals are produced that continue the reaction and oxidized off-flavor becomes stronger with time. Aldehydes, ketones, and methional are compounds that typically cause oxidized off-flavors. "Metal-induced" oxidized off-flavor has been described as a cardboard-like or tallowy taste, and "light-induced" oxidized off-flavor has been described as a cabbage-like, chemical-like, burnt protein, burnt feathers, burnt plastic, or mushroom-like taste (Bodyfelt, F. W., J. Tobias, and G. M. Trout, 1988, The Sensory Evaluation of Dairy Products, Van Nostrand Reinhold, New York, N.Y.). It has been postulated that when the amino acid methionine is exposed to light in the presence of riboflavin (vitamin $B_2$), which is also present in milk, a degradation occurs which leads to the formation of methional. Methional is an important compound that contributes to "light-induced" oxidized off-flavor (Patton, S., 1954, J. Dairy Sci. 37:446).

While a number of studies have reported the inhibition or partial inhibition of the formation of a "light-induced" oxidized off-flavor in milk, none of the known studies have reported the reversal of a light-induced oxidized off-flavor in milk once the off-flavor has been formed in the milk.

Thus, while the known literature has dealt to some extent with attempts to prevent or mitigate the formation of the an oxidized off-flavor in milk, the techniques described in the literature fail to address the reduction or elimination of the oxidized off-flavor in milk once it has occurred. Therefore, there is a need for a method for removing or reversing the oxidized off-flavor in the milk once it has occurred.

SUMMARY OF THE INVENTION

In view of the foregoing failure of the prior art to provide a means for removing or reversing an oxidized off-flavor in milk, the present invention is believed to fulfill a significant need in the milk processing industry for solving the vexing problem presented by the acquired oxidized off-flavor.

The present inventors have discovered a method to reverse light-induced oxidized off-flavor in milk and after storage time the milk will taste like normal milk. The invention may be integrated into conventional milk processing that is typically used in a milk processing plant.

To attain this, the present invention generally contemplates a method of reversing the formation of an oxidized off-flavor in milk that comprises providing milk, and heating the milk to a temperature between approximately 70° C. and approximately 90° C. for a period of between approximately 25 seconds and approximately 60 seconds.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the capability to remove or reverse an oxidized off-flavor from milk as a part of milk processing in a milk processing plant.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
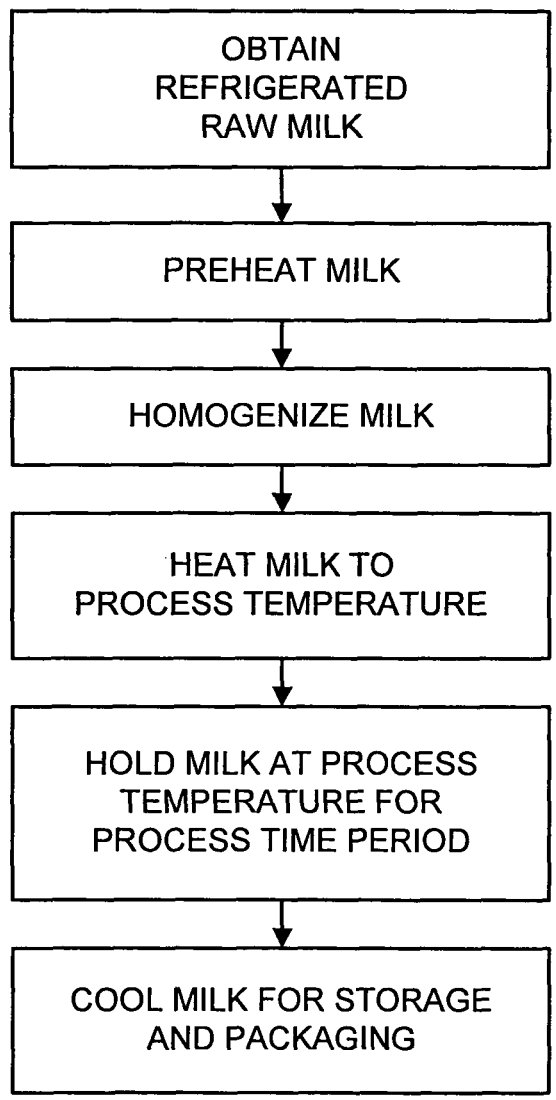
FIG. 1 is a schematic flow diagram of a new process for reversing or removing an oxidized off-flavor from milk according to the present invention.
Figure 2:
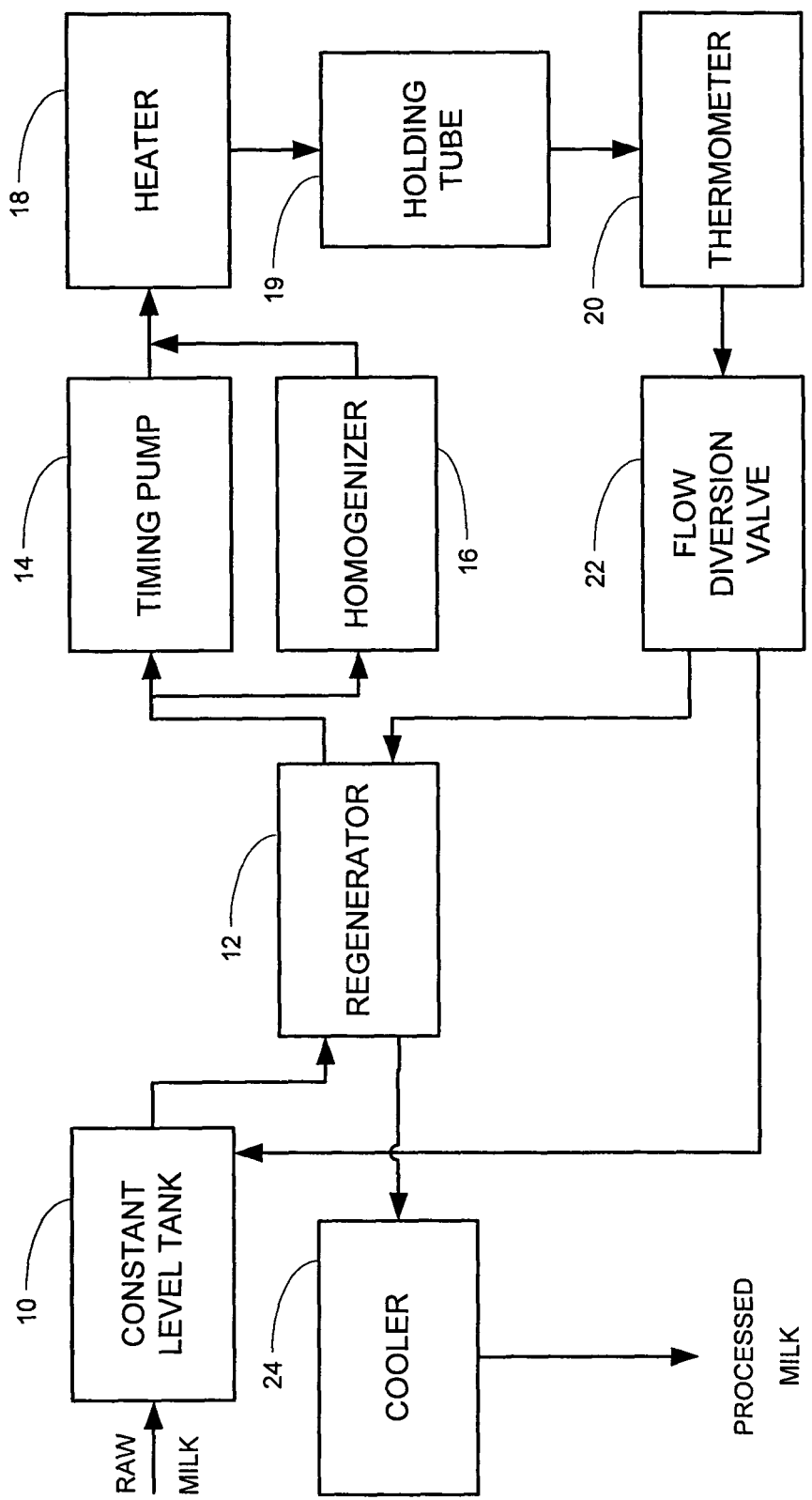
FIG. 2 is a schematic and highly simplified diagram of an apparatus suitable for practicing the process of the present invention.

With reference now to the drawings, and in particular to FIGS. 1 and 2 thereof, a new method for removing an oxidized off-flavor in milk embodying the principles and concepts of the present invention will be described.

To facilitate the description of the invention, and provide a common understanding of the terms used in describing the invention, a number of definitions will be set forth before the invention is described in detail.

For the purpose of this description, "milk" refers to the lacteal secretion produced by a ruminant animal, such as a dairy cow. The milk may contain various fat concentrations, and thus includes, but is not limited to, skim or nonfat milk, 1% (low) fat milk, 2% (reduced) fat milk, or whole milk, as well as flavored milks of these various fat concentrations. The milk may be homogenized or not homogenized.

The term "oxidized off-flavor" has the usual meaning in the art and refers to a taste exhibited by milk having milk fat which has at least begun to oxidize.

The term "metal-induced" oxidized off-flavor refers to an oxidized off-flavor in milk that has resulted from exposure to a metal, such as, for example, copper or iron that initiates the oxidation of milk fat. Milk that has a metal-induced oxidized off-flavor typically has a cardboard-like taste or tallowy taste, and a smell that is undesirable.

The term "light-induced" oxidized off-flavor refers to an oxidized off-flavor in milk that has resulted from exposure to light that includes ultraviolet wavelengths in the 350 to 500 nanometer range, such as, for example, fluorescent light or sunlight. Milk that has a light-induced oxidized off-flavor has a typical burnt feathers, burnt protein, or burnt plastic taste and a smell that is undesirable. Light-induced oxidized milk is also known as light-activated flavor in milk.

The term "clear plastic container" has the usual meaning in the art and refers to clear plastic containers that comprise, for example, high-density polyethylene or polyethylene terephthalate which is typically used to manufacture plastic milk containers. Ultraviolet light from fluorescent light or sunlight is easily transmitted through plastic containers formed of such material.

The term "opaque plastic container" has the usual meaning in the art and refers to opaque plastic containers (typically white, yellow, or cream in color) that are composed of high-density polyethylene or polyethylene terephthalate which is typically used to manufacture clear plastic containers. Opaque plastic contains added light-blocking resins. Ultraviolet light from fluorescent light or sunlight can be transmitted through these opaque plastic containers, but to a much lesser extent than clear plastic containers.

The term "unsaturated fatty acid" has the usual meaning in the art and refers to a fatty acid containing one or more double-bonds in the hydrocarbon chain of the molecule.

The term "antioxidant" has the usual meaning in the art and refers to substances that inhibit or stop oxidation.

The term "prooxidant" has the usual meaning in the art and refers to substances that promote or initiate oxidation.

The present invention provides a new method that is useful in the production and marketing of excellent tasting milk for consumers. The method reverses the formation of a light-induced oxidized off-flavor that has occurred in milk, and is highly suitable for application to milk that is packaged for the retail market in the clear plastic containers or opaque plastic containers.

The practice of the invention may typically be in a milk processing plant, although application of the process to milk may be employed in other situations or locations. Milk is collected from a ruminant animal, such as a dairy cow, prior to the practice of the process of the invention.

Significantly, the process of the invention is highly effective for reversing an existing oxidized off-flavor characteristic of milk. Perhaps more significantly, the process of the invention is also highly effective for "pretreating" milk so that if the milk does subsequently acquire an oxidized off-flavor after the milk has been processed according to the invention (through, for example, exposure to light), the oxidized off-flavor characteristic will tend to be reversed or mitigated or removed as time passes and the milk has been removed from exposure to the oxidizing element. Thus, the milk may be tested (such as by tasting) to determine if a light-induced oxidized off-flavor is present in the milk. However, in other implementations of the process of the invention, the process of the invention may be practiced on milk without making a determination as whether there is a light-induced oxidized off-flavor present in the milk, and may be performed regardless of whether an oxidized off-flavor has been detected in the milk. The process of the invention may thus be implemented as a normal part of the processing regimen of the milk at a milk processing plant.

The milk may be "refreshed" by the process of the invention, which may be performed during the conventional processing of the milk. Illustratively, and generally, raw milk is collected in a tank 10 prior to processing, which is typically a constant level tank in which the level of the milk is continuously maintained. The milk flows out of the tank 10 to a regenerator 12 that preliminarily heats the milk flow using heat recaptured or transferred from milk that has previously passed through a heating apparatus. The milk flow is then directed to a timing pump 14 which controls the time spent by the milk in the various stages of the system by controlling the speed of the milk flow through the stages. The milk may be passed through a homogenizer 16 at this stage, optionally as an alternative to flowing through the timing pump.

The milk flow then moves through a heater 18 that heats the milk to the desired process temperature. The milk flow then moves into a holding tube 19 that functions to hold the milk at the desired process temperature for the desired process time period. The temperature of the milk at the end of the holding tube 19 is measured by a thermometer 20, and the milk passes through a flow diversion valve-22 that diverts the milk flow back to the tank 10 if the desired process temperature is not present at the end of the holding tube 19. The milk flow that has reached the desired process temperature is not diverted back to the tank 10, and is passed through the regenerator 12. The milk flow exiting the regenerator 12 then enters a cooler 24 that cools the processed milk for storage and packaging.

It should be recognized that although the process of the invention may be practiced as a portion of an otherwise conventional milk processing system, the portion of the milk processing system implementing the invention is distinguishable from the conventional milk processing system. More particularly, the inventive processing is distinguishable from conventional stages such as pasteurization, which involves heating the milk for a significantly shorter period of time. Typical holding times for heated milk in commercial milk processing are between about 15 and 19 seconds, and typically these times are reduced significantly if the pasteurization temperature of the process is increased over more conventional pasteurization temperatures. The present invention contemplates the heating and holding of the milk for longer periods of time, periods longer than approximately 25 seconds, and up to approximately 60 seconds. More preferably, the desired process time may range between approximately 30 seconds and approximately 50 seconds for holding the heated milk. In one highly preferred implementation of the invention, the desired process time ranges between approximately 30 seconds and approximately 40 seconds for holding the heated milk.

In some implementations of the process, the desired temperature may be in the range between approximately 70° C. and approximately 90° C. With respect to the desired process temperature, a highly preferred range of temperatures is between approximately 75° C. and approximately 85° C., and may more preferably range between approximately 75.5° C. and approximately 83.5° C.

In greater detail, the milk may be heated to a process temperature between approximately 75.56° C. and approximately 83.50° C. (approximately 168° F. to approximately 178° F.) for a process time period of approximately 30 to approximately 40 seconds. In a preferred implementation of the invention, the milk is heated to a process temperature of approximately 78.89° C. (approximately 174° F.) for a process time of approximately 37 seconds.

The heating of the milk to the desired temperature for the desired time contemplated by the invention is preferably accomplished by adjusting the temperature to which the milk is heated by the heater 18, and by extending the length of the holding tube 19 to accomplish the holding of the heated milk flow at the process temperature for the process time. The length of the holding tube 19 would thus be significantly longer than a length of a holding tube designed for conventional milk processing. It will be recognized that the process time may be achieved by adjusting factors other than the length of the holding tube 19, including, for example, adjusting the flow rate of the milk through the holding tube 19.

The "refreshed" milk is then packaged for the retail market, and may be packaged in clear plastic containers or opaque plastic containers that contain light-blocking agents added to the high-density polyethylene or polyethylene terephthalate resin.

As an illustration of the comparative results of applying the inventive process to milk, Table 1 shows flavor scores of milk that has been exposed to fluorescent light in clear plastic containers over the various periods of time set forth in the table. In one case, the milk is 2% reduced fat milk that was "refreshed" according to the present invention, and in another case, the milk is 2% reduced fat milk that was not "refreshed" according to the present invention. For the purposes of the example, a flavor score of 1 indicates no light-induced oxidized off-flavor (excellent or best flavor), 5 indicates definite light-induced oxidized off-flavor, and 9 indicates a pronounced light-induced oxidized off-flavor (poorest flavor). The flavor scores for "refreshed" 2% reduced fat milk in Table 1 are based upon milk that has been heated to approximately 78.89° C. (174° F.) for approximately 37 seconds. The flavor scores for "not refreshed" 2% reduced fat milk are based upon milk that has been heated to approximately 80.00° C. (176° F.) for approximately 18 seconds, placed in clear plastic containers exposed to fluorescent light (1000 lux) over time (0 to 24 hours) and stored at 4° C. In large supermarkets, a milk sales turnover rate ranges between 4 and 8 hours and typical fluorescent light intensity ranges from 750 to 1000 lux (White, C., 1984, Dairy Record 85(4):122), so storage times and fluorescent light exposure (1000 lux) were selected to simulate typical commercial conditions under which the majority of fluid milk is sold in the United States.

TABLE 1

| Fluorescent light exposure time (hours) | Storage time (hours) | | | |
|---|---|---|---|---|
| | 0 | 24 | 72 | 96 |
| | Flavor scores[b] | | | |
| "Refreshed" 2% reduced fat milk | | | | |
| 0 | 1 | 1 | 1 | 1 |
| 4 | 4 | 2 | 1 | 1 |
| 4½ | 4 | 2 | 2 | 1.5 |
| 5 | 5 | 4 | 3 | 2.5 |
| 6 | 5 | 5 | 3 | 4 |
| 7 | 6 | 5.5 | 5 | 5 |
| 24 | — | 7 | 6 | 6 |
| Not "refreshed" 2% reduced fat milk | | | | |
| 0 | 1 | 1 | 1 | 1 |
| 4 | 4.5 | 5 | 3 | 5 |
| 4½ | 5 | 6 | 5.5 | 6 |
| 5 | 6 | 6.5 | 6 | 6 |
| 6 | 6 | 7 | 6 | 7 |
| 7 | 7 | 7 | 7 | 8 |
| 24 | — | 8 | 8 | 8 |

In the illustrative example, the 2% reduced fat milk that was exposed to fluorescent light for four hours was "refreshed" and the light-induced oxidized off-flavor score of the milk was improved from a score of four to a score of one (excellent or best flavor) after 72 and 96 hours of storage. The formation of the light-induced oxidized off-flavor in the milk was substantially completely reversed to the flavor of normal milk. Flavor scores of "refreshed" 2% reduced fat milk improved, changing from a score of 5 (definitely exhibiting a light-induced oxidized off-flavor) to a score of 2.5 (exhibiting only a slight light-induced oxidized off-flavor) after up to five hours of exposure to fluorescent light and storage of the treated milk up to 96 hours. Flavor scores of the "refreshed" 2% reduced fat milk improved only slightly after exposure to fluorescent light for 6, 7, and 24 hours and storage of the treated milk for 96 hours. The not "refreshed" 2% reduced fat milk exhibited a definite light-induced oxidized off-flavor after 4 or more hours of exposure to fluorescent light. The not "refreshed" 2% reduced fat milk exhibited no reversal of light-induced oxidized off-flavor in any of the samples, during storage for up to 96 hours. The "refreshed" 2% reduced fat milk appeared to exhibit a definite reversal of light-induced oxidized off-flavor for milk exposed to fluorescent light for four, four and one-half, and five hours after storage of the treated milk for 24, 72, and 96 hours.

In another illustration of the effectiveness of the process of the invention, Table 2 shows flavor scores of "refreshed" 2% reduced fat milk heated to approximately 78.89° C. (approximately 174° F.) for approximately 37 seconds, and not "refreshed" 2% reduced fat milk heated to approximately 80.00° C. (approximately 176° F.) for approximately 18 seconds in white plastic containers that were exposed to fluorescent light (1000 lux) over time a period of time (0 to 24 hours) and stored at 4° C.

TABLE 2

| Fluorescent light exposure time (hours) | Storage time (hours) | | | | |
|---|---|---|---|---|---|
| | 0 | 24 | 72 | 96 | 168 |
| | Flavor scores[b] | | | | |
| "Refreshed" 2% reduced fat milk | | | | | |
| 0 | 1 | 1 | 1 | 1 | 1 |
| 4 | 1 | 1 | 1 | 1 | 1 |
| 6 | 2 | 1 | 1 | 1 | 1 |
| 7 | 3 | 1 | 1 | 1 | 1 |
| 9 | 3.5 | 2 | 1 | 1 | 1 |
| 11 | 5 | 3.5 | 2 | 1 | 1 |
| 24 | — | 5 | 4.5 | 4.5 | 4.5 |
| Not "refreshed" 2% reduced fat milk | | | | | |
| 0 | 1 | 1 | 1 | 1 | 1 |
| 4 | 2 | 3 | 3.5 | 4 | 3 |
| 6 | 3 | 4 | 4 | 5 | 4.5 |
| 7 | 4 | 5 | 5 | 6 | 6 |
| 9 | 5 | 5 | 6 | 6 | 7 |
| 11 | 6 | 6 | 7 | 7 | 7 |
| 24 | — | 7 | 7.5 | 8 | 8 |

Flavor scores of "refreshed" 2% reduced fat milk and not "refreshed" 2% reduced fat milk exposed to fluorescent light in white plastic containers over time are given in Table 2. In the "refreshed" 2% reduced fat milk that was exposed to fluorescent light for up to 11 hours, the taste of the milk improved to a score of one (excellent or best flavor) after 168 hours of storage. In these milks, the light-induced oxidized off-flavor appeared to be completely reversed to the flavor of normal milk. The flavor scores of the refreshed 2% reduced fat milk showed little reversal of light-induced oxidized off-flavor after exposure to fluorescent light for 24 hours and storage after 168 hours. The not "refreshed" 2% reduced fat milk exhibited no reversal of light-induced oxidized off-flavor in any of the samples after fluorescent light exposure for any storage time.

The foregoing is considered as illustrative only of the principles of the invention. Further, since numerous modifications and changes will readily occur to those skilled in the art, it is not desired to limit the invention to the exact implementation and operation shown and described, and accordingly, all suitable modifications and equivalents may be resorted to, falling within the scope of the invention.

We claim:

1. A method of removing or reversing the formation of an oxidized off-flavor in milk, consisting of:
   providing milk; and
   heating the milk to a temperature of between approximately 70° C. and approximately 90° C. for a period of between approximately 25 seconds and approximately 60 seconds.

2. A method of reversing or removing the formation of an oxidized off-flavor in milk consisting of:
   providing raw milk;
   subjecting said milk to a pasteurization process;
   heating said raw processed milk to a temperature of between approximately 75° C. and approximately 85° C. for a period of between approximately 30 seconds and approximately 40 seconds; and
   cooling said milk.

* * * * *